US012210442B2

(12) United States Patent
Duraisamy et al.

(10) Patent No.: US 12,210,442 B2
(45) Date of Patent: Jan. 28, 2025

(54) AUTOMATED TESTING OF DATABASE COMMANDS

(71) Applicant: SAP SE, Walldorf (DE)

(72) Inventors: Ganesh Moorthy Duraisamy, Chinnamadham palayam (IN); Shreepathi Kukkila, Bengaluru (IN); Shivendu, Bengaluru (IN); Harsini R, Bengaluru (IN); Suhas Ramji, Bengaluru (IN); Arvind Viswanathan, Bengaluru (IN); Abhishek Mishra, Bengaluru (IN)

(73) Assignee: SAP SE, Walldorf (DE)

( * ) Notice: Subject to any disclaimer, the term of this patent is extended or adjusted under 35 U.S.C. 154(b) by 111 days.

(21) Appl. No.: 18/082,434

(22) Filed: Dec. 15, 2022

(65) Prior Publication Data

US 2024/0202105 A1 Jun. 20, 2024

(51) Int. Cl.
*G06F 11/36* (2006.01)
*G06F 16/21* (2019.01)

(52) U.S. Cl.
CPC ...... *G06F 11/3676* (2013.01); *G06F 11/3684* (2013.01); *G06F 11/3688* (2013.01); *G06F 16/217* (2019.01)

(58) Field of Classification Search
CPC .................................. G06F 8/65; G06F 1/206
USPC .................................................. 717/120–178
See application file for complete search history.

(56) References Cited

U.S. PATENT DOCUMENTS

| | | | | |
|---|---|---|---|---|
| 5,651,111 A | * | 7/1997 | McKeeman | G06F 11/3688 714/E11.208 |
| 6,138,112 A | * | 10/2000 | Slutz | G06F 11/3672 717/124 |
| 6,249,882 B1 | * | 6/2001 | Testardi | G06F 11/3672 714/38.14 |
| 10,970,196 B1 | * | 4/2021 | Goel | G06F 11/3688 |
| 10,997,060 B2 | * | 5/2021 | Fugate | G06F 11/3672 |

(Continued)

OTHER PUBLICATIONS

Fritzson, Peter, et al. "Generalized algorithmic debugging and testing." ACM Letters on Programming Languages and Systems (LOPLAS) 1.4 (1992): pp. 303-322. (Year: 1992).*

(Continued)

*Primary Examiner* — Satish Rampuria
(74) *Attorney, Agent, or Firm* — Klarquist Sparkman, LLP

(57) ABSTRACT

Techniques and solutions are provided for database testing. In particular, aspects of the present disclosure facilitate "automatic exploration" of testing of database features, such as database commands. In particular, test definitions can be created for particular database features, where a test definition can have variants. Different test definitions can be combined into a composite test, which can include different variants for different tests. An executable test can be created that allows a database to execute a composite test. The present disclose also provides techniques and solutions for analyzing test results, particularly when voluminous test results are returned. In one example, test results for multiple iterations of a test can be compared. A change in test results, for example, can cause a test result to be flagged for further review. The composite tests, or result analysis techniques, can help provide better testing of database software to help identify software errors/bugs.

20 Claims, 8 Drawing Sheets

(56) References Cited

U.S. PATENT DOCUMENTS

2007/0011522 A1* 1/2007 Denniston .......... G06F 11/2236
714/724
2010/0318314 A1* 12/2010 Luff .................. G01R 31/2834
702/121
2021/0390038 A1 12/2021 Mietke

OTHER PUBLICATIONS

Liu, Chao, et al. "Statistical debugging: A hypothesis testing-based approach." IEEE Transactions on software engineering 32.10 (2006): pp. 831-848. (Year: 2006).*
Weimer, Westley, Zachary P. Fry, and Stephanie Forrest. "Leveraging program equivalence for adaptive program repair: Models and first results." 2013 28th IEEE/ACM International Conference on Automated Software Engineering (ASE). IEEE, 2013. pp. 256-366. (Year: 2013).*
Tanno, Haruto, et al. "TesMa and CATG: automated test generation tools for models of enterprise applications." 2015 IEEE/ACM 37th IEEE International Conference on Software Engineering. vol. 2. IEEE, 2015. pp. 717-720. (Year: 2015).*
Alsharif, Abdullah, Gregory M. Kapfhammer, and Phil McMinn. "What factors make SQL test cases understandable for testers? A human study of automated test data generation techniques." 2019 IEEE International Conference on Software Maintenance and Evolution (ICSME). IEEE, 2019.pp. 437-448. (Year: 2019).*
Le, Vu, Chengnian Sun, and Zhendong Su. "Finding deep compiler bugs via guided stochastic program mutation." Acm Sigplan Notices 50.10 (2015): pp. 386-399. (Year: 2015).*
Extended European Search Report, received in European Patent Application No. 23216368.3-1203 dated May 6, 2024, 8 pages.

* cited by examiner

```
CREATE [ OR REPLACE ] VIEW <view_name> [ COMMENT <string_literal> ]
[ ( <column_name_list> ) ] [ ( <parameterized_view_clause> ) ]
<as_subquery> [ <with_association_clause> ]
[ WITH EXPRESSION MACROS( <expression_macro_list>) ]
[ WITH <annotations> ]
[ WITH ANONYMIZATION ( ALGORITHM <algorithm_name> { [ ( <view_level_parameters> ) ]
<column_level_parameters> ] } ) ]
[ WITH [ CHECK OPTION ][ <mask_clause> ]
| WITH [READ ONLY] [DDL ONLY] [ <mask_clause> ]
[ <cache_clause> ]

⌐114a
                          ⌐14c
                                      ⌐110
114b                      ⌐114

<parameterized_view_clause> ::= <parameter_definition> [,...]
<parameter_definition> ::= IN <parameter_name> <parameter_datatype> [ <default_value> ]
      ⌐122a    ⌐122b                              ⌐122c              ⌐122d
                          ⌐118

⌐150

CREATE [ <table_type> ] { <table_name> | <replica_name> }
<table_contents_source>
  [<system_versioning_spec>]
  [<application_time_period_configuration>]
  [<bi_temporal_table_spec>]
  [<with_association_clause>]
  [<with_annotation_clause>]
  [<with_mask_clause>]
  [<logging_option>]
  [<auto_merge_option>]
  [<unload_priority_clause>]
  [<schema_flexibility_option>]
  [<partition_clause>]
  [<persistent_memory_spec_clause>]
  [<group_option_list>]
  [<location_clause>]
  [<replica_clause>]
  [<with_replica_list>]
  [<global_temporary_option>]
  [<series_clause>]
  [<unused_retention_period_option>]
  [<record_commit_timestamp_clause>]
  [COMMENT <comment_string>]
  [<numa_node_preference_clause>]
  [<load_unit>]

Create View                     Number of outputs = 3(21) = 63
    Create view with static cache retention
    Create view on the table
    Create view with check option Create Synonym                  Number of outputs =1(63) = 63
    Create a synonym on the created artifacts Create Projection               Number of outputs =1(63) = 63
    Project the synonym with select * on all columns Create SQL-script               Number of outputs =1(63) = 63
    Create a procedure that returns table of any table Call Statements                 Number of outputs =1(63) = 63
    Call the created procedure Total Number of outputs =1 + 7 + 21 +63 + 63 + 63 + 63 + 63 = 344

510 Create a first test definition for a first database feature, the first test definition including a first syntax including a first set of one or more syntax elements and a first set of one or more values for at least a first syntax element of the first set of one or more syntax elements, where a set of one or more values for a given syntax element of the first set of one or more syntax elements defies, at least in part, a variant for the first test definition

520 Create a second test definition for a second database feature, the second test definition including a second syntax including a second set of one or more syntax elements and a second set of one or more values for at least a first syntax element of the second set of one or more syntax elements, the second test definition further including an identifier indicating that the first test definition serves as a predecessor or successor to the second test definition

530 Based at least in part on the first syntax, the second syntax, at least one syntax element of the first set of one or more syntax elements, and at least one syntax element of the second set of one or more syntax elements, create an executable test definition of a first composite test including a variant of the first test definition and a variant of the second test definition, wherein the executable test definition includes commands executable by a database to perform the first composite test

FIG. 5

AUTOMATED TESTING OF DATABASE COMMANDS

FIELD

The present disclosure generally relates to software, such as software used to implement a database. Particular implementations relate to automated determination and execution of software tests for database features.

BACKGROUND

Software is becoming increasingly complex, partly due to the vast array of functionality that can be provided by software and because of the various different ways software can be used by end users. Testing software for errors or bugs is problematic even with relatively small and simple programs. As software becomes more complex, testing software to identify potential bugs can be quite daunting. One reason for this is that different software features can be used together, and a coding error or issue may only arise when certain combinations of features are used, or even when particular data is being processed by a particular combination of features.

Consider software that implements a relational database system. The software may include functionality that allows a user to create a view, where the view can have a variety of different syntax elements or parameters, which can be specified using a syntax defined for view creation. It may be desirable to test view creation using the different syntax element (or values therefor) and parameters provided by the view creation syntax. However, the view itself can reference a database table, where the database table has its own syntax with a variety of syntax elements and parameters. Some software errors may only arise when a particular view syntax element, or syntax element value, or parameter is used with a particular table feature or parameter.

Consider now that a table may have ten different features and a view may have ten different features. Testing each of the features individually provides a total of twenty tests to be executed—ten each for the table and the view. Testing the features of the table and the view in combination provides an additional one hundred tests to be generated, executed, and analyzed to determine whether there might be errors in the table code or the view code. The situation becomes more complex in that the operation of the table code, the view code, or the table code and the view code in combination can depend on the particular data that is being processed. Thus, different data sets can be used for testing, but each data set can result in the execution of another one-hundred twenty tests.

Even simply using the view code and the table code, it can be seen how the number of tests can be significant. However, software, including database software, can be much more complex, often with several hundred features. For instance, tables and views can be in use with other features like PROJECTION code, SYNONYM code, SELECT code, among others. Combining all these features for testing can exponentially increase a number of code combinations that could be tested. Thus, it can be difficult to thoroughly test software that is released to customers, which can result in the customers encountering software errors/bugs during use. In some cases, the end result can be more serious than a desired operation failing—the software error can cause the entire software program to crash, which can cause serious problems for a program users. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for database testing. In particular, aspects of the present disclosure facilitate "automatic exploration" of testing of database features, such as database commands. In particular, test definitions can be created for particular database features, where a test definition can have variants. Different test definitions can be combined into a composite test, which can include different variants for different tests. An executable test can be created that allows a database to execute a composite test. The present disclose also provides techniques and solutions for analyzing test results, particularly when voluminous test results are returned. In one example, test results for multiple iterations of a test can be compared. A change in test results, for example, can cause a test result to be flagged for further review. The composite tests, or result analysis techniques, can help provide better testing of database software to help identify software errors/bugs.

In one aspect, the present disclosure provides a process for creating an executable test definition, that is executable by a database, to perform a composite test of at least first and second database features. A first test definition is created for a first database feature. The first test definition has a first syntax that includes a first set of one or more syntax elements and a first set of one or more values for at least a first syntax element of the first set of one or more syntax elements. A set of one or more values for a given syntax element of the first set of one or more syntax elements defines, at least in part, a variant for the first test definition.

A second test definition for a second database feature is created. The second test definition has a second syntax that includes a second set of one or more syntax elements and a second set of one or more values for at least a first syntax element of the second set of one or more syntax elements. The second test definition further includes an identifier indicating that the first test definition serves as a predecessor or successor to the second test definition.

Based at least in part on the first syntax, the second syntax, at least one syntax element of the first set of one or more syntax elements, and at least one syntax element of the second set of one or more syntax elements, an executable test definition of a first composite test is created. The first composite test includes a variant of the first test definition and a variant of the second test definition. The executable test definition includes commands executable by a database to perform the first composite test.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 1 is a diagram illustrating how database features can have a plurality of syntax elements, and where one database feature can be used in conjunction with another database feature.

FIGS. 3A and 3B illustrate how combining different software features, and variants thereof, can rapidly produce more tests than can be practicable to manually define, execute, or analyze.

FIG. 5 is a flowchart of a process for creating an executable test definition, that is executable by a database, to perform a composite test of at least first and second database features.

DETAILED DESCRIPTION

Example 1—Overview

Figure 2:
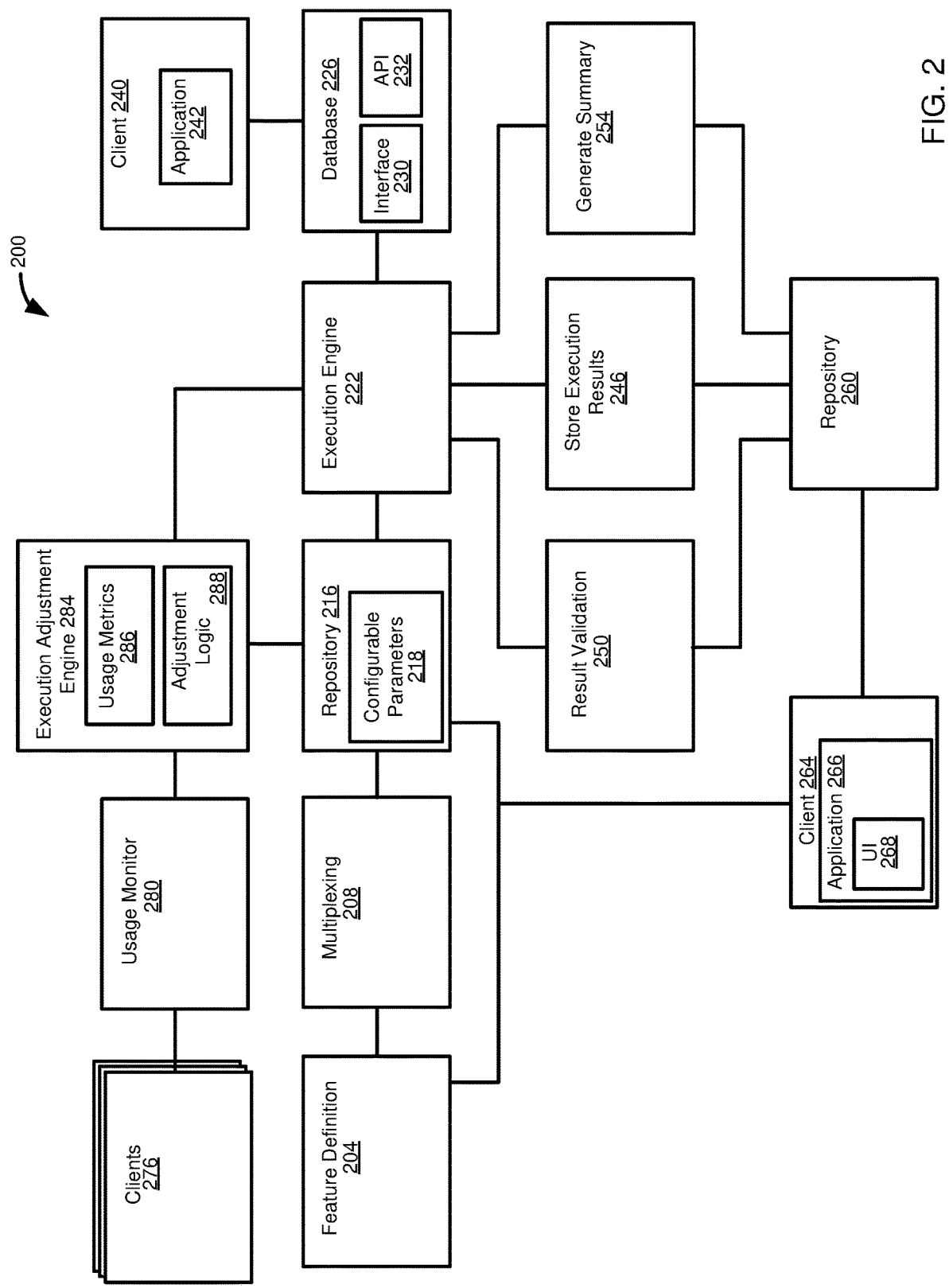
FIG. 2 is an example process, including components useable therein, for defining, executing, and analyzing tests of database features, including combinations of database features.

Software is becoming increasingly complex, partly due to the vast array of functionality that can be provided by software and because of the various different ways software can be used by end users. Testing software for errors or bugs is problematic even with relatively small and simple programs. As software becomes more complex, testing software to identify potential bugs can be quite daunting. One reason for this is that different software features can be used together, and a coding error or issue may only arise when certain combinations of features are used, or even when particular data is being processed by a particular combination of features.

Consider software that implements a relational database system. The software may include functionality that allows a user to create a view, where the view can have a variety of different syntax elements or parameters, which can be specified using a syntax defined for view creation. It may be desirable to test view creation using the different syntax element (or values therefor) and parameters provided by the view creation syntax. However, the view itself can reference a database table, where the database table has its own syntax with a variety of syntax elements and parameters. Some software errors may only arise when a particular view syntax element, or syntax element value, or parameter is used with a particular table feature or parameter.

Consider now that a table may have ten different features and a view may have ten different features. Testing each of the features individually provides a total of twenty tests to be executed—ten each for the table and the view. Testing the features of the table and the view in combination provides an additional one hundred tests to be generated, executed, and analyzed to determine whether there might be errors in the table code or the view code. The situation becomes more complex in that the operation of the table code, the view code, or the table code and the view code in combination can depend on the particular data that is being processed. Thus, different data sets can be used for testing, but each data set can result in the execution of another one-hundred twenty tests.

Even simply using the view code and the table code, it can be seen how the number of tests can be significant. However, software, including database software, can be much more complex, often with several hundred features. For instance, tables and views can be in use with other features like PROJECTION code, SYNONYM code, SELECT code, among others. Combining all these features for testing can exponentially increase a number of code combinations that could be tested. Thus, it can be difficult to thoroughly test software that is released to customers, which can result in the customers encountering software errors/bugs during use. In some cases, the end result can be more serious than a desired operation failing—the software error can cause the entire software program to crash, which can cause serious problems for a program users. Accordingly, room for improvement exists.

The present disclosure provides for techniques that can be useful for defining, executing, and interpreting software tests. Tests for various software functionality can be defined, including defining other software functionality that serves as input and test features that should be combined with test features of other software functionality. That is, a given software feature can have one or more base variants to be tested, where the base variants can be considered with base variants of another software feature. As in the example above, this can result in base variants of a table being tested with base variants of a view that uses a table as input. A software feature can also have advanced variants, which can be tests that are performed for that software feature, but are not combined, or "multiplexed," with base or advanced variants of another software feature. In some cases, a user may wish to have specific tests performed, and custom tests can be specified to be performed in addition to the base and advanced variants. A test formed from variants of multiple features can be referred to as a composite test.

Once the software features are specified for testing, such as in a feature test definition object (which can have components as described in conjunction with FIG. 4, as will be further discussed), code for executing tests and tests combinations can be generated. In the example of testing of database features, query language commands can be generated for base and advanced variants of a feature, and query language commands can be generated for combinations of base variants of different features. For the combinations, in some cases features can be combined in a single query language command, which in other cases the combinations can be expressed as a sequence of query language commands to be executed. If desired, the resulting code can be checked to ensure that the code is valid given the constraints of a particular programming language (e.g., checking to make sure that tokens, syntax, or semantics are valid), or whether all features or data referred to in a particular test exist/are defined.

Tests can then be executed. Results can be received, stored, and analyzed. Just as generating individual tests can be an overwhelming task, so can interpreting test results. Disclosed techniques provide for automatically analyzing, categorizing, and prioritizing different execution results, including tests that produced errors or whose execution provided different results compared with a prior execution result, including an execution result on a prior version of a database (for example, where two versions of a database differ in code used in executing a feature of a test associated with changed results).

Given the vast number of tests that can be generated using disclosed techniques, it can be useful to prioritize execution of tests, to modify parameters used in test execution, or adjust the tests. Usage data can be obtained for one or more database systems. The usage data can include what features are used, or how often they are used, as well as information regarding parameters used during feature execution, including configuration of a database environment during feature execution. The usage data can be analyzed to prioritize features to test, or to execute tests using configurations that are representative of the usage data. In some cases, the usage data can also be used to modify tests, or to suggest test modifications. For example, assume a particular feature is included in a test as an advanced variant, and thus not multiplexed with base variants from other features. If usage data indicates that aspects of an advanced feature are heavily used, a test definition can be modified to recategorize advanced variants as base (or advanced) variants, or to otherwise use an advanced variant in multiplexing.

Example 2—Example Feature and Relationships Therebetween

FIG. 1 illustrates example "features" that can be used in test definitions. As discussed in Example 1, a feature can represent functionality of a database system that can be called by a user or a computing process, such as commands to create or modify database objects, or commands to query data stored in such database objects.

In particular, FIG. 1 illustrates a syntax 110 for defining a database view, where a view can reference one or more other views, one or more tables, or a combination of one or more tables and one or more other views. Note that the syntax 110 has elements that can represent required or optional parameters or functionality. For example, syntax element 114a represents a name for a view being created, and can be a required element. On the other hand, syntax element 114b, through which annotations can be specified, can be an optional element.

Database views that can be defined using the syntax 110 can depend on other features. While database views can be created solely with reference to other database views, at some point a collection of one or more database views includes a view that includes a reference to a database table. As shown in the syntax 110, a syntax element 114c is shown for "parameterized view clause."

The parameterized view clause of the syntax element 114c may itself have additional syntax elements, as shown in the insert 118. The insert 118 also includes a parameterized view clause, syntax element 122a, which can correspond to the syntax element 114c, but where the syntax element 122a is now shown as defined with respect to a "parameter definition" syntax element 122b, which in turn is described with respect to syntax elements 122c and 122d of "parameter name" and "parameter data type." The syntax elements 122c and 122d can be used to create references to a database table (or another database view).

Examples of how the syntax 110 can be used include:
CREATE VIEW myView2 (c1, c2) (IN p1 int, IN p2 VARCHAR(10)) AS SELECT col1, col2 FROM myTable1 WHERE col1=: p1 AND col2=: p2;
CREATE VIEW my View1 (IN p1 INT, IN p2 VARCHAR(10)) AS SELECT col1, col2 FROM myTable1 WHERE col1=: p1 AND col2=: p2;

Note that each of these "CREATE VIEW" features/commands includes a SELECT clause where a table is specified using the "FROM" token of a query language.

FIG. 1 also illustrates a syntax 150 for creating a table. Like the syntax 110 for creating a view, the syntax 150 for creating a table includes a number of syntax elements 154, some of which are required and some of which are optional. Syntax elements 154 can depend on other features or syntax element definitions. For example, consider a "table type" syntax element 154a. In the HANA database system of SAP SE of Walldorf, Germany, table types can include row tables or column tables, history column tables, temporary tables, or virtual tables. Temporary tables can be further specified as global temporary tables or local temporary tables.

Each syntax element of the syntax 110 or the syntax 150 can be associated with code that implements the specified functionality. Thus, while it may be possible to test for some code errors for an individual feature, in many cases code errors may not arise until particular syntax elements of a feature (or particular values therefor) are specified, optionally further combined for particular syntax elements of predecessor features (where a table can be considered as a predecessor of a view). It can be seen that even in the comparatively simple example with two features, the table and the view, that the number of possible test permutations is very large. In practice however, even larger numbers of features are used in combination, and the number of tests needed to evaluate software functionality can quickly reach into the thousands, or even millions. Manually creating, executing, and interpreting results from even a fraction of these tests can be impractical, and so some code errors may not be discovered until the code is in actual use, such as by customers of a software company. In some cases, errors can be obvious when they occur, such as by crashing an entire database system, but in other cases errors can be more pernicious. For example, consider a software error that does not crash a database system, but results in erroneous data. There could be significant delay in discovering such a problem, which could cause a user significant harm.

Example 3—Example Test Generation, Execution, and Analysis Process, and Components Thereof FIG. 2 illustrates an example process flow 200, and certain associated components, using disclosed techniques. At 204, features to be tested are defined. As will be further described, defining a feature to be tested can include providing a syntax for the feature (for example, the syntax 110 of the create view feature of FIG. 1). The syntax can be used for a variety of purposes, including to define "variants" of the syntax to be tested, where a "variant" can, for example, specify particular values/options for particular syntax elements or parameters. Features can be specified that can either be used by the feature being defined, or which can use the feature being defined. This "predecessor" and "successor" information can be used, for example, to determine how various features are combined when tests are created. The syntax can also be used, along with content specified for variants, to generate executable commands used for text execution.

Features defined at 204 can be combined, or "multiplexed." at 208, to form composite tests. Multiplexing involves automatically combining different features to obtain tests that test multiple features in combination, including using different variants of the features. Consider a scenario where features A, B, and C are to be tested. Assuming such combinations are supported by the dependencies between the objects, tests could include testing features of A, B, and C alone, testing features of A and B together, testing features of B and C together, and testing features of all of A, B, and C in combination. Now assume that A and B each have three variants, A1, A2, A3, B1, B2, B3. All of those variants could be tested alone, and then in combination—A1 and B1, A1 and B2, etc. Multiplexing can be useful, as it can save a user the effort of manually defining large numbers of test combinations. That is, multiplexing provides for automatic exploration or enumeration of tests, although a user can optionally influence or guide what test combinations are generated.

Once features, alone or in combination, have been defined as tests, code implementing the tests can be created. For example, for database operations, appropriate SQL commands/statements can be generated. The tests and their associated definitions can then be stored in a repository 216. Various techniques can be used to define test combinations, which can depend on the particular feature being tested. Rules can be specified, including when a feature available for testing is being defined, as how feature combinations should be executed. For instance, in some cases it may be possible to concatenate or otherwise combine two features in a single query language statement. In other cases, code implementing various features of a test can be executed serially, such as by defining a script that sequentially executes commands for features associated with a test having multiplexed features.

The repository 216 can also store configurable parameters 218 for test execution, including values for such parameters. Some configurable parameters 218 can be specified for particular tests, or particular features of particular tests. At least some of the configurable parameters 218 can relate to a database environment in which tests are executed. For example, a parameter can be used to set a number of database system nodes, such as scale out nodes, that are to be used in executing a test, including setting a maximum number or a minimum number of nodes. Additional parameters can specify limits on a number of features/tests/query language statements to be executed, or a number of concurrent operations to be executed. Parameters can also be used to specify how test commands should be provided by a system, such as a particular interface to the database system, examples of which can include command line interfaces that directly access the database system or commands provided through a graphical user interface or submitted externally using an application programming interface.

An execution engine 222 causes tests to be executed, such as by submitting commands associated with tests of the repository 216 to an appropriate database/computing system to be executed, such as a database 226, where the database can have an interface 230 through which commands can be submitted, or where an API 232 (such as a REST API) can be used that allows for external submission of tasks to the database. In some cases, the API 232 can be called by a client 240 that includes an application 242. In such a scenario, tests can be provided to application 242 of the client 240 (for example, by the execution engine 222), and then submitted to the API 232 to be processed by components of the database 226.

In some implementations, the execution engine 222 can also generate testing scenarios. For example, the repository 216 can include feature definitions, including information usable to establish links between features that can be used in feature combinations. This information can be used by the execution engine 222 to generate a graph (for example, a directed graph, based on predecessor information), where individual features form nodes or vertices of the graph, and edges are defined by the relationship information (such as predecessor information). In another implementation, each variant, or variant combination, is considered as a vertex. In cases where a single value for a single syntax element is represented as a vertex, the graph can be constructed such that at least some of these vertices can be connected to vertices representing variants for a given feature where the variant includes a value for a different syntax element. For example, consider a feature that has a syntax element A having values 1, 2, 3 and a syntax element B having values 4, 5, 6. Variants can include feature A with 1, 2, or 3, as well as variants with A(1+4), A(1+5), A(1+6), A(2+4), etc.

Relationships between vertices for a particular feature (or variant thereof) can be restricted using the syntax, or another mechanism, such that only "valid" combinations are generated, or a larger number of combinations can be generated, and the generated commands can be subsequently checked for validity. Data flows for particular tests can then generated by combining commands for particular features, including for particular variants of particular features, such as by using a depth first search algorithm. In particular, each step in the depth first search algorithm can be considered as a flow, where a flow represents a particular test to be executed.

The execution engine 222 can receive execution results from the execution of tests by the database 226. The results can be sent directly from the database 226 to the execution engine 222, or the results can be provided by the database to the client 240, where the execution results are then sent from the client to the execution engine. Optionally, the results can be sent to a component other than the execution engine 222, such as being directly sent to a storage location or to a component that analyzes test results.

Test results can include information about whether a test completed, completed with errors, or failed to complete. Test results can also include result data provided by the database 226. For example, if test creates a table, the test result may be simply whether the task completed as expected. If the test included options to retrieve data from a table, the test results can include whether the task completed as expected, as well as the actual data retrieved from the table. In some cases, even if data from the database 226 is provided as result data, it may not be of interest for test analysis purposes, and so can be filtered from test results by the database 226, the application 242/client 240, or by the execution engine 222.

In some cases, it may be desirable to determine whether two executions of a particular test produce the same results, in terms of data provided by the database 226, or data derived at least in part therefrom. If the details of the data are not needed for such comparisons, another value can be provided that allows for comparison of test results. For example, data provided by the database 226 can be processed using a hash function to provide a hash value. If two iterations of a test have the same hash value, it can be determined that a same result was achieved. If the hash values are different, it can be determined that some aspect of the data/test results differed between test iterations.

All or a portion of execution results can be stored at 246. As will be further described, storing execution results can be useful both to have the data available for later analysis and to allow the results of multiple executions of a particular test to be compared. In particular, if a change to software implementing the database 226 is modified, comparing test execution results from before the modification with results after modification can help confirm whether the database is operating as expected, and to help isolate possible sources of error if operation is not as expected.

Execution results that are stored at 246 can include identifiers of particular tests executed and a time of test initiation, or a time of test completion. When both the times of test start and completion are maintained, the values can be used to determine how long the database 226 took to complete a test. Optionally, the execution time can be separately calculated or otherwise determined and stored as part of the execution results, in addition to or in place of one or both of the test start time or the test completion time.

Stored execution results can also include result data or summaries of result data, including a hash value of actual result data. Other summaries of result data can include information such as a number of records returned or a size (for example, in terms of memory/secondary storage) of a result set.

Stored execution results can further include indicators of whether particular tests completed successfully, along with any error codes or messages that might have been provided by the database 226, the application 242, or another component associated with test execution or processing.

Results can be validated at 250. Result validation can include comparing results from two or more executions of a particular test. Result comparison can in turn include determining whether data associated with results is the same, such as using a hash value, or comparing whether a test, or portion thereof, completed successfully, and optionally any error codes or messages that may have been received. Unexplained or unexpected errors can also be used during result validation, where often such errors will indicate that test results should be flagged for further review or processing. For example, a "connection reset by peer" error can indicate that a test caused the database system 226 to crash, which may be of more serious concern than if a test completed with errors.

At this point, it should be noted that, as described above, tests can include multiple features, and test results can be maintained for a test as well as for particular features in the test. In a particular example, an overall test may have a status of "failed," but information can also be maintained for particular features of particular tests, such as whether a portion of a test for a particular feature executed successfully and error information for a particular feature.

Test failures can be expected in some cases, and so that a test, or a particular tested feature, failed, may not indicate a "problem" that needs to be addressed. Thus, result validation at 250 can include analyzing test results to determine whether a test result, whether success or failure, may be indicative of a software issue or other problem. The following example rules indicate an overall pass/fail result for a test iteration using pass/fail results for a historical test and a current test, or particular feature thereof:

PASS-PASS=PASS
FAIL-FAIL=PASS
PASS-FAIL=FAIL
FAIL-PASS=FAIL

However, different rules can be specified. For example, a change from a fail result to a pass result can be treated as a pass result, while repeated failures can be treated as a fail result. Another way of applying these rules to consider that a pass/fail result determines whether a particular test will be flagged for further review/inclusion in test results, at least based solely on the application of the rules, rather than a fail result definitely indicating a software error. An overall result of FAIL can simply indicate that a test result will be flagged for review/included in test results.

Machine learning techniques can also be used in the result validation process 250. In one example, a neural network or other classifier is trained using a set of test results and labels as to whether the results are or are not associated with a software error. The trained classifier can then be employed in the process 250 to help filter newly generated test results, and where feedback as to the accuracy of the machine learning predictions can be used to refine the machine learning model.

A summary of execution results can be generated at 254. A summary of execution results can include providing information about failed tests or tests that have been flagged for further review, including as filtered using the result validation process 250. Information provided in summary results can include a test identifier, test execution parameters (for example, values of the configurable parameters 218), test execution time, test execution duration, a summary of any data that may have been received as part of test execution, a test execution result, or error codes associated with test failures. Similar information can also be provided for individual features within a particular test. As discussed, in some cases a summary of execution tests is only generated for test results that indicate a failed test, or which were otherwise flagged for inclusion in the test summary during the result validation process 250.

Information for one or more of result validation information from the process 250, the execution results stored as a result of the process 246, or summary information generated at 254 can be stored in a repository 260. The repository 260 can be the same as, or different than the repository 216 that stores test definitions. Information in the repository 260 (or 216) can be stored in various formats, including storing at least some information in the form of relational database tables. For information stored in a database format, the repository 260 (or 216) can be the database 226, or can be a database other than the database 226.

Information in the repository 260, or otherwise associated with the processes 246, 250, 254, can be retrieved by a client 264, which can include an application 266 having a user interface 268 that allows users to view and interact with result information. Optionally, the client 264, including in some cases the application 266, can be used in defining features at 204, or in defining the configurable parameters 218, including values for particular configurable parameters.

As explained in Example 1, it may be difficult to anticipate how computing software may be used, including software implementing the database 226, or what configuration parameter values might used for the database 226, during software execution. Consider a developer wishing to test software prior to a release. The developer may have to guess as to what features are likely to be used by customers, what variants would be used, how individual features might be used in combination, or what configurable parameters might be set. If testing does not reflect actual productive usage of the software, then testing may not have been performed for a particular use case, which can result in a software error for a customer, and the accompanying problems discussed in Example 1.

Disclosed techniques thus also provide for gathering usage information, where such information can be presented to users, such as users defining features at 204, or to help select values for the configurable parameters 218. The usage information can also be used to automatically guide the definition or execution of tests, or the selection of values for the configurable parameters 218.

Consider that software, such as a version of software implementing the database 226, or software having at least some features analogous to features of the database, is used by one or more clients 276. Usage of the software can be tracked by a usage monitor 280 which, for example, can record database operations executed by a client 276. In the context of a relational database, the database operations can include data definition language statements, such as to define or modify database tables or views, or operations to perform create, read, update, or delete operations for data stored in such database tables or views, such as using data manipulation language statements or data query language statements. These operations can be tracked or counted by the usage monitor 280 to provide usage metrics 286, which can be maintained by the usage monitor or, as shown, as part of an execution adjustment engine 284. Optionally, the usage metrics 286 can be stored elsewhere, such as a repository that is accessible to the execution adjustment engine 284, such as the repository 216 or the repository 260.

The usage monitor 280 can also record values set by clients corresponding to the configurable parameters 218, which can be part of the usage metrics 286, including being stored with other types of usage metrics. Examples of configurable parameters 218 that can be monitored include a number of partitions, maximum and minimum values used for range partitions, volume of data processing, a number of maximum number of nodes and edges in a spatial database, or a maximum number of nested JSON objects, or maximum number of elements in an array, in an object or document store.

The execution adjustment engine 284 includes adjustment logic 288, which can be used to interact with the repository 216 or the execution engine 222. The execution adjustment engine 284 can, in some cases, determine what tests should be executed and when. For example, if the usage metrics 286 indicate that a particular feature is being more heavily used by the clients 276, tests including the feature can be scheduled to be executed, or to be executed more frequently. Similarly, the usage metrics 286 can be used in determining how "deeply" a test should be executed that incudes a particular feature tracked by the usage metrics. That is, the number of tests and associated features that can be generated, particularly during multiplexing at 208, or during flow generation by the execution engine 222 can be adjusted, such as by altering the scope of a depth first search algorithm, or by specifying particular nodes that should or should not be included in paths. That is, multiplexing can include tests having different testing depths, where a deeper testing can include a larger number of related features.

For features, or particular syntax elements or particular values thereof, identified as being highly used by the clients 276 according to the usage metrics 286, or perhaps where a feature sees a significant change in a degree of use, tests including that feature can be executing having a greater depth. Similarly, features prioritized by the adjustment logic 288 based on the usage metrics 286, or particular syntax elements or particular syntax element values, can be tested with a larger number of variants, to more thoroughly test the feature. Optionally, if a feature is identified as satisfying threshold criteria, such as use over a particular time period, advanced variants for a feature can be used during multiplexing at 208 (that is, multiplexing operations can be triggered by the adjustment logic 288), and optionally stored in the repository 216.

In a similar manner, values for the configurable parameters 218 in the usage metrics 286 can be used to adjust values stored in the repository 216, or the execution engine 222 can be caused to execute tests using values for the configurable parameters as indicated by the usage metrics 286.

Usage metrics can also be used to set minimum or maximum values for a composite test, or features thereof, including setting such values for syntax elements, configurable parameters, or data used in conjunction with a syntax element (such as a maximum value to be used in an "INSERT" operation).

Example 4—Example Test Multiplexing, Including Graph Representation

Figure 3A:
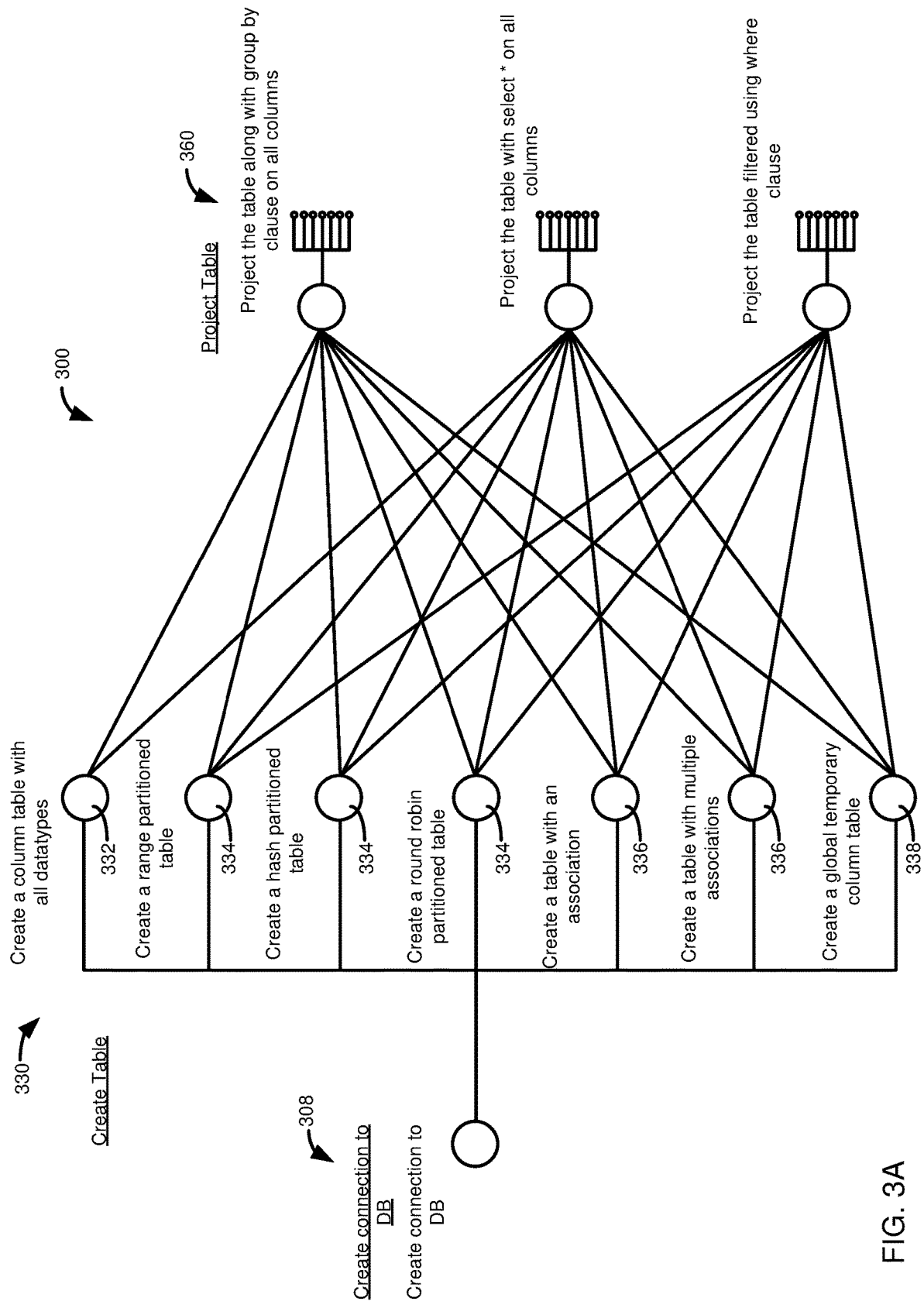

FIG. 3A illustrates an example multiplexing process 300, illustrating how multiplexing of features can rapidly generate large numbers of tests, particular when features within a given test have multiple variants to be tested. The features/variants can represent a graph that can be used during test multiplexing or otherwise in generating test combinations to be executed such as by the execution engine 222 of FIG. 2.

The process 300 includes three features. A first feature 308 involves creating a connection to a database. A second feature 330 involves creating a relational database table. A third feature 360 involves projecting a table. Note that the three features in the process of 300 are interdependent, in the sense that later features follow the execution of earlier features. In particular, the project table feature 360 assumes the creation of a table using the feature 330, and the creation of the table assumes that database connection has been established using the feature 308. Various features can be tested in other ways. For example, assuming a database already has a created table, the project table feature 360 could be executed on the existing table rather than following the creation of a table in a test that also includes the create table feature 330.

While the feature 308 includes a single variant, the create table feature 330 includes multiple variants for different syntax elements of the create table functionality. In particular, variant 332 specifies the creation of a table that is in column format and has columns of all datatypes that are available for this purpose in the particular database system being tested, while variants 334 specify different ways a table may be partitioned. Variants 336 specify that a table should have one or more associations to another database object, while variant 338 specifies that the table being created is a temporary table of a particular type.

While the present disclosure has described multiplexing of features, including multiplexing different variants of one feature with different variants of another feature, multiplexing can include testing different combinations of variants for a particular feature, whether alone or in combination with variants, or different combinations of other variants, of other features. Stated another way, variants can correspond not just to different values for a single syntax element of a feature, but can include permutations of a feature having different values of different combinations of syntax elements, including variants where different optional syntax elements are included (or excluded).

For example, for the create table process 330, the creation of a column table type indicated by the variant 332 could be combined with any one of the variants 334, and all three of these variants could then be combined with a different type of association specified by the variants 336, and where the table is a temporary type as indicated by the variant 338. Or, the different partitioning variants 334 could be combined with the association variants 336, but the combination could exclude the variant 332. For simplicity of presentation, FIG. 3 only illustrates the multiplexing of a single variant of the create table feature 330 with the different variants of the project table feature 360.

Even for the simplified multiplexing of FIG. 3, the single variant of the feature 308, the seven variants of the feature 330, and the three variants of the project table feature 360 provide a total of twenty-one tests, without considering variant combinations for individual features and without considering testing of lower degrees of multiplexing—that is, testing only one of the features 308, 330, 360, and any of their variants or testing combinations of any two of the features. Thus, it can be seen how testing combinations of features and their corresponding variants can quickly become time consuming and error prone, in designing and executing tests, as well as in analyzing test results.

FIG. 3B illustrates additional features, and associated variants, that can be multiplexed with the features 308, 330, 360. A "create view" feature can use the output of the feature 360 as input, where the feature 360 in turn is multiplexed with the features 308, 320. If the features 308, 330, 360 have a total of twenty-one combinations (1*3*7), just looking at single variant combinations between multiplexed features, a total of sixty-three combinations, individual tests, are obtained. Even if the remaining four features to be multiplexed only include a single variant, each feature produces another sixty-three tests. For all levels of multiplexing considered in a linear manner (that is tests for feature 308 alone, tests for feature 330, etc. and tests for features 308 and 330 in combination, test for features 308, 330, 360 in combination, etc.) a total of three-hundred and forty-four tests are generated. Again, this is a very large number of tests, for a relatively small number of features, many with a single variant, and without considering that a given feature may have multiple available variant combinations, each of which could be multiplexed with various variant combinations of other features.

In practice, the number of tests for a given scenario can easily run over one-thousand tests, and in some cases can exceed one-million tests, as illustrated in the following table:

| Feature | Variants | No. of Generated SQL Statements |
|---|---|---|
| Create table | 384 | 384 |
| projection | 2 | 768 |
| View | 27 | 10368 |
| Synonym | 1 | 384 |
| Index | 576 | 221184 |
| Rename Column | 4 | 1536 |
| Function | 126 | 1306368 |
| Fuzzy Index | 120 | 46080 |

Total Number of SQL Statements: 1587072

Figure 4:
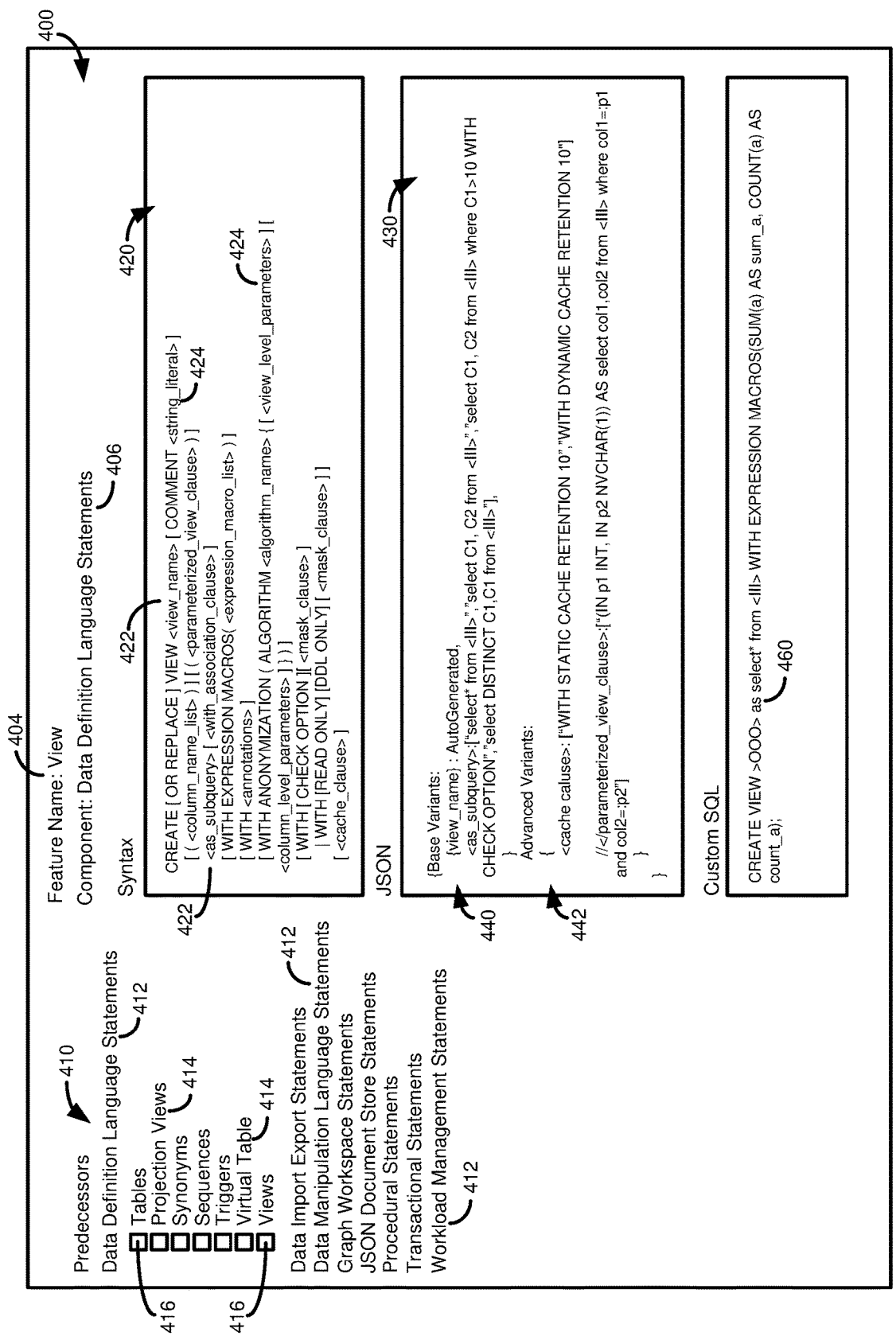
FIG. 4 is an example user interface screen illustrating how a feature to be tested can be defined, including a syntax and variants that can specify values for particular syntax elements of the syntax.

Example 5—Example User Interface Screen for Feature Definition, and Illustrating Feature Components FIG. 4 provides an example user interface screen 400 for defining tests for a particular feature, and also illustrates how components of tests can be implemented, including the provision of information that can be used to multiplex different features.

An identifier or name 404 for a feature can be provided, such as through a suitable user interface element, such as a text field. In FIG. 4, the name 404 identifies the feature as a view. Different features can be associated with different components, where a component can be a particular class or type of feature. In particular, the feature being defined in the user interface screen involves the creation of a view. View creation can be associated with a command that is an example of a data definition language (DDL) statement. Accordingly, a component identifier 406 identifies the feature as being part of the DDL statement class/component.

A given feature can use other features as input, and these types of relationships can be used to guide multiplexing operations. In some cases, particular rules can be specified, such as that one component class can serve an input to another component class. In other cases, these relationships can be manually specified. As shown, the user interface screen 400 includes a predecessor definition area 410. The predecessor definition area 410 includes a plurality of components 412, which can be selected for expansion to show features 414 that have been defined for/associated with a given component. The user interface screen 400 can include user interface elements, such as check boxes 416, that a user can select to indicate that a particular feature is available as input to the feature 404 being defined.

A syntax 420 can be entered for the feature. The syntax 420 can be used in generating executable commands for the feature 404, and can also be used in defining variants. In particular, the syntax 420 can have one or more required syntax elements 422 and one or more optional syntax elements 424. Various characters/tokens can be used to identify syntax elements, including whether a syntax element is optional or required. Syntax elements 420, 424 can be identified by being included with the "< >" characters, such as "<syntax element>". Optional syntax elements 424 can be indicated as such by including the syntax element within the "[ ]" characters, such as "[<optional syntax element>]." Additional tokens, operators, or characters can be used to identify properties of syntax elements, such as whether two syntax elements have a disjunctive relationship, which can be indicated using the "|" character.

The syntax 420 can represent a format in which a database expects to receive commands. In many cases, a syntax is provided in user documentation, and the syntax can in some cases be copied and pasted from a source document, such as electronic document format or webpage, into the user interface screen 400 to serve as the syntax 420. Or, the syntax 420 can be manually entered, or provided in another manner.

The user interface screen also provides a variants definition 430. A variant definition 430 provides example values for any syntax elements 422 and optionally one or more of the optional syntax elements 424. A given syntax element 422, 424 can have a single value or multiple values. In the example shown, the variants definition 430 provides a single value for the required "view name" syntax element and three values for the required syntax element "as subquery." In some cases, multiple values can be treated as an array of values, and a particular variant to be tested can be generated using particular index values of the array. In the example shown, a given syntax element in the variants definition 430 is followed by the ":" character, an array is identified used "[ ]" characters, and different values for a given syntax element are enclosed within quotation marks and separated by commas. Again, these particular tokens can be used in parsing the variant definition 430 to generate variants, and corresponding commands, to be executed.

The variants definition 430 can include different types of variants. In particular, a variants definition 430 can include base variants 440 and advanced variants 442. Base variants 440 can be those which will be tested and also used in multiplexing, while advanced variants 442 can be tested for the specific feature 404, but at least in some implementations are not used for feature multiplexing. In some cases, base variants 440 can include values for required syntax elements 422, while advanced variants 442 also include optional syntax elements 424. However, basic and advanced variants 440, 442 can have different properties. In particular, a basic variant 440 can include one or more optional syntax elements 424, and an advanced variant 442 can include additional values for required syntax elements 422 that are not specified in a base variant 440.

The variant definition 430 can be implemented in a variety of manners, but in particular examples can be implemented in JSON or CSON. In practice, a software component can automatically scan a variant definition 430, identify syntax elements and specified values, and then substitute those values into the syntax 420. This process can be facilitated by specific definitional conventions for the syntax 420 or the variant definition 430. For optional syntax elements 424, these elements can be removed from generated executable statements if no values are specified in a base variant 440 or an advanced variant 442.

In some cases, a developer, administrator, or other user may have specific test scenarios they wish to evaluate. In some cases, corresponding executable statements might not be generated based on the syntax 420 and the variant definition 430, including if programmatic logic determines which values to test for syntax elements and what syntax elements to be tested in combination. Accordingly, the user interface screen 400 can provide for the entry of custom commands 460, which will be executed when a test of the feature 404 is made (unless some other configuration setting indicates otherwise). For custom commands 460, when analysis results are provided, the analysis results for custom commands 460 can optionally be provided with applying all or a portion of the result validation logic 250 of FIG. 2.

Example 6—Example Test Definition Process

FIG. 5 is a flowchart of a process 500 for creating an executable test definition, that is executable by a database, to perform a composite test of at least first and second database features. In particular implementations, the process 500 can be performed in the computing environment 200 of FIG. 2, and can be defined using techniques described in conjunction with FIG. 4.

At 510 a first test definition is created for a first database feature. The first test definition has a first syntax that includes a first set of one or more syntax elements and a first set of one or more values for at least a first syntax element of the first set of one or more syntax elements. A set of one or more values for a given syntax element of the first set of one or more syntax elements defines, at least in part, a variant for the first test definition.

A second test definition for a second database feature is created at 520. The second test definition has a second syntax that includes a second set of one or more syntax elements and a second set of one or more values for at least a first syntax element of the second set of one or more syntax elements. The second test definition further includes an identifier indicating that the first test definition serves as a predecessor or successor to the second test definition.

At 530, based at least in part on the first syntax, the second syntax, at least one syntax element of the first set of one or more syntax elements, and at least one syntax element of the second set of one or more syntax elements, an executable test definition of a first composite test is created. The first composite test includes a variant of the first test definition and a variant of the second test definition. The executable test definition includes commands executable by a database to perform the first composite test.

Example 7—Computing Systems

Figure 6:
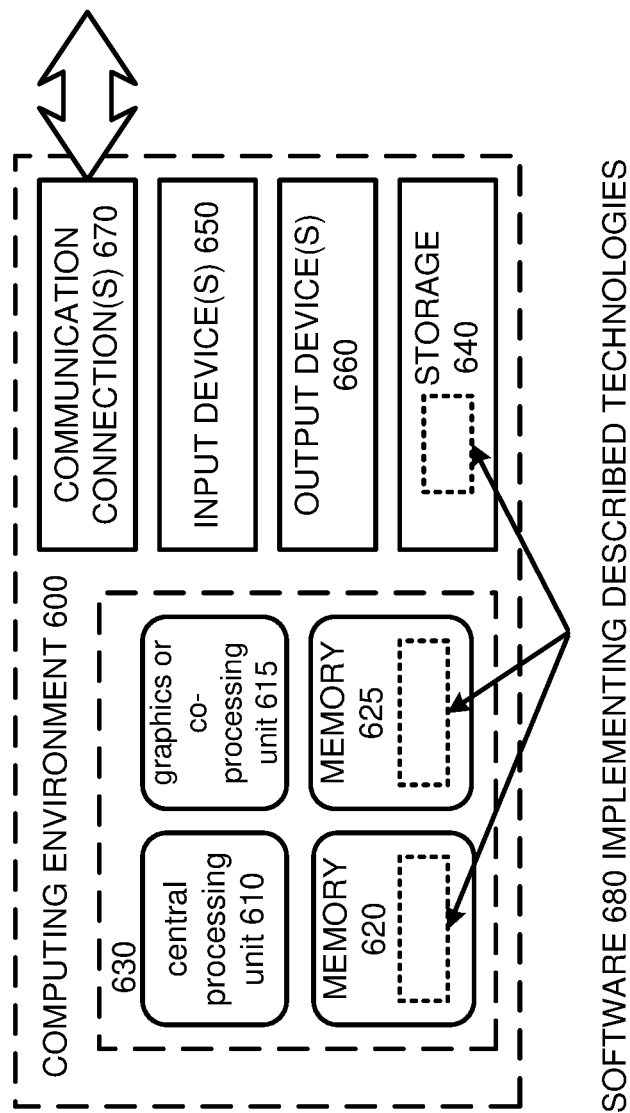
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality of the present disclosure, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions, such as for implementing components of the processes of the present disclosure. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s) 610, 615. The memory 620, 625 stores software 680 implementing one or more innovations described herein, in the form of computer-executable instructions suitable for execution by the processing unit(s) 610, 615. The memory 620, 625, may also store settings or settings characteristics, databases, data sets, interfaces, displays, object instances, or model.

A computing system 600 may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way, and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8—Cloud Computing Environment

Figure 7:
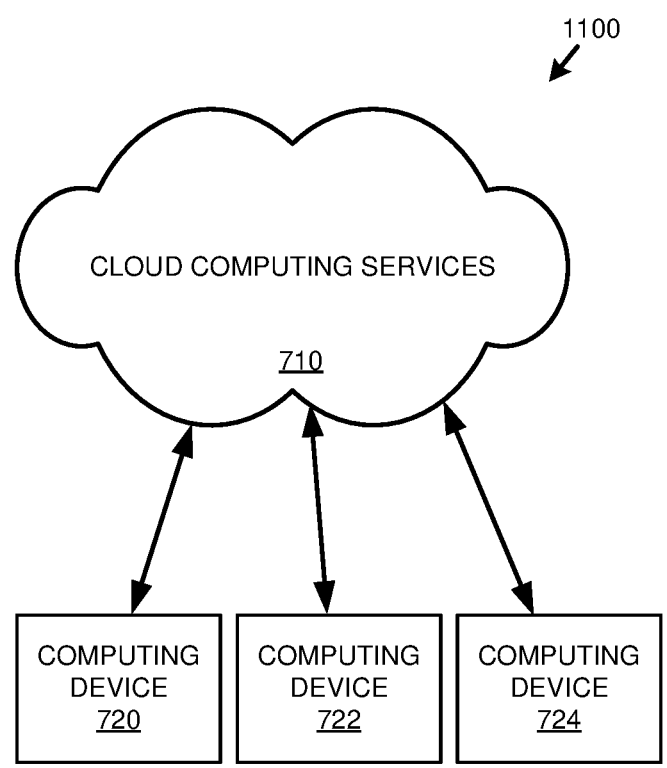
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operations (e.g., data processing, data storage, and the like).

Example 9—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:
      creating a first test definition for a first database feature, the first test definition comprising a first syntax comprising a first set of one or more syntax elements and a first set of one or more values for at least a first syntax element of the first set of one or more syntax elements, wherein a set of one or more values for a given syntax element of the first set of one or more syntax elements defines, at least in part, a variant for the first test definition;
      creating a second test definition for a second database feature, the second test definition comprising a second syntax comprising a second set of one or more syntax elements and a second set of one or more values for at least a first syntax element of the second set of one or more syntax elements;
      based at least in part on the first syntax, the second syntax, at least one syntax element of the first set of one or more syntax elements, and at least one syntax element of the second set of one or more syntax elements, creating an executable test definition of a first composite test comprising a variant of the first test definition and a variant of the second test definition, wherein the executable test definition comprises commands executable by a database to perform the first composite test; and
   (A) causing a plurality of composite tests to be executed, the plurality of composite tests comprising the first composite test; and
      (1) receiving execution results generated from execution of the plurality of compositive tests; and comparing an execution result of the first composite test of the execution results with an execution result of a prior execution of the first composite test; or
      (2) receiving execution results generated from execution of the plurality of composite tests, wherein the execution results comprise error codes for at least a portion of the plurality of composite tests; or
      (3) receiving execution results generated from execution of the plurality of composite tests, wherein the execution results comprise an indication of an error generated during execution of at least one composite test of the plurality of composite tests that is not associated with an error code; or
      (4) receiving execution results generated from execution of the plurality of composite tests, wherein the execution results comprise data generated during execution of at least one composite test of the plurality of composite tests; or
      (5) receiving execution results generated from execution of the plurality of composite tests, wherein the execution results comprise a summary of data generated during execution of at least one composite test of the plurality of composite tests; or
   (B) monitoring use of one or more database instances executing a version of software implementing the database to provide usage data, the usage data comprising data indicating database features executed on the one or more database instances and values for at least one syntax element of a database feature reflected in the usage data.

2. The computing system of claim 1, the operations further comprising:
   receiving at least a first value for at least a first configurable parameter used in execution of the first composite test; and
   selecting the at least the first value for use during execution of the first composite test.

3. The computing system of claim 2, the operations further comprising:
   monitoring use of one or more database instances executing a version of software implementing the database to provide usage data, the usage data comprising the at least a first value, wherein the receiving the at least a first value is based at least in part on the monitoring.

4. The computing system of claim 1, the operations further comprising:
   monitoring use of one or more database instances executing a version of software implementing the database to provide usage data, the usage data comprising data indicating database features executed on the one or more database instances and values for at least one syntax element of a database feature reflected in the usage data.

5. The computing system of claim 4, the operations further comprising:
   altering the executable test definition of the first composite test based at least in part on the usage data to comprise a value of the usage data for a syntax element of the usage data.

6. The computing system of claim 4, the operations further comprising:
   generating a second composite test based at least in part on the first syntax and the second syntax, wherein the second composite test comprises a different syntax element or syntax element value than the first composite test, and the different syntax element or syntax element value is selected based at least in part on the usage data.

7. The computing system of claim 4, wherein the first set of one or more syntax elements are used in defining base variants useable in the first composite test, and the first syntax further defines a third set of one or more syntax elements that are used in defining advanced variants, where an advanced variant is by default not considered for use in a composite test comprising syntax elements from a plurality of database features, the operations further comprising:

based at least in part on the usage data, defining a second composite test that comprises an advanced variant.

8. The computing system of claim 1, wherein the first set of one or more syntax elements are used in defining base variants useable in the first composite test and the first syntax further defines a third set of one or more syntax elements that are used in defining advanced variants, where an advanced variant is not considered for use in a composite test comprising syntax elements from a plurality of features, at least under a first set of conditions.

9. The computing system of claim 1, the operations further comprising:
receiving execution results generated from execution of the plurality of composite tests; and
comparing an execution result of the first composite test of the execution results with an execution result of a prior execution of the first composite test.

10. The computing system of claim 9, the operations further comprising:
determining that the execution result of the first composite test and the execution result of the prior execution of the first composite test are consistent; and
generating an indication that the first composite test passed based at least in part on the determining that the execution result of the first composite test and the execution result of the prior execution of the first composite test are consistent.

11. The computing system of claim 10, the operations further comprising:
based at least on the indication, filtering execution results for the first composite test from the execution results.

12. The computing system of claim 9, the operations further comprising:
determining that the execution result of the first composite test and the execution result of the prior execution of the first composite test are not consistent; and
generating an indication that the first composite test failed based at least in part on the determining that the execution result of the first composite test and the execution result of the prior execution of the first composite test are not consistent.

13. The computing system of claim 12, the operations further comprising:
based at least on the indication that the first composite test failed, including execution results for the first composite test in the execution results.

14. The computing system of claim 1, the operations further comprising:
causing a plurality of composite tests to be executed, the plurality of composite tests comprising the first composite test; and
receiving execution results generated from execution of the plurality of composite tests, wherein the execution results comprise error codes for at least a portion of the plurality of composite tests.

15. The computing system of claim 1, the operations further comprising:
causing a plurality of composite tests to be executed, the plurality of composite tests comprising the first composite test; and
receiving execution results generated from execution of the plurality of composite tests, wherein the execution results comprise an indication of an error generated during execution of at least one composite test of the plurality of composite tests that is not associated with an error code.

16. The computing system of claim 1, the operations further comprising:
causing a plurality of composite tests to be executed, the plurality of composite tests comprising the first composite test; and
receiving execution results generated from execution of the plurality of composite tests, wherein the execution results comprise data generated during execution of at least one composite test of the plurality of composite tests.

17. The computing system of claim 1, the operations further comprising:
causing a plurality of composite tests to be executed, the plurality of composite tests comprising the first composite test; and
receiving execution results generated from execution of the plurality of composite tests, wherein the execution results comprise a summary of data generated during execution of at least one composite test of the plurality of composite tests.

18. The computing system of claim 1, wherein the second test definition further comprises an identifier indicating that the first test definition serves as a predecessor or successor to the second test definition.

19. A method, implemented in a computing system comprising at least one memory and at least one hardware processor coupled to the at least one memory, the method comprising:
creating a first test definition for a first database feature, the first test definition comprising a first syntax comprising a first set of one or more syntax elements and a first set of one or more values for at least a first syntax element of the first set of one or more syntax elements, wherein a set of one or more values for a given syntax element of the first set of one or more syntax elements defines, at least in part, a variant for the first test definition;
creating a second test definition for a second database feature, the second test definition comprising a second syntax comprising a second set of one or more syntax elements and a second set of one or more values for at least a first syntax element of the second set of one or more syntax elements; and
based at least in part on the first syntax, the second syntax, at least one syntax element of the first set of one or more syntax elements, and at least one syntax element of the second set of one or more syntax elements, creating an executable test definition of a first composite test comprising a variant of the first test definition and a variant of the second test definition, wherein the executable test definition comprises commands executable by a database to perform the first composite test and;
(A) causing a plurality of composite tests to be executed, the plurality of composite tests comprising the first composite test; and
(1) receiving execution results generated from execution of the plurality of compositive tests; and
comparing an execution result of the first composite test of the execution results with an execution result of a prior execution of the first composite test; or
(2) receiving execution results generated from execution of the plurality of composite tests, wherein the execution results comprise error codes for at least a portion of the plurality of composite tests; or (3) receiving execution results generated from execution of the plurality of composite tests, wherein the execution results comprise an indication of an error generated during execution of at least one composite test of the plurality of composite tests that is not associated with an error code; or (4) receiving execution results generated from execution of the plurality of composite tests, wherein the execution results comprise data generated during execution of at least one composite test of the plurality of composite tests; or (5) receiving execution results generated from execution of the plurality of composite tests, wherein the execution results comprise a summary of data generated during execution of at least one composite test of the plurality of composite tests; or (B) monitoring use of one or more database instances executing a version of software implementing the database to provide usage data, the usage data comprising data indicating database features executed on the one or more database instances and values for at least one syntax element of a database feature reflected in the usage data.

20. One or more non-transitory computer-readable storage media comprising:

computer-executable instructions that, when executed by a computing system comprising at least one hardware processor and at least one memory coupled to the at least one hardware process, cause the computing system to create a first test definition for a first database feature, the first test definition comprising a first syntax comprising a first set of one or more syntax elements and a first set of one or more values for at least a first syntax element of the first set of one or more syntax elements, wherein a set of one or more values for a given syntax element of the first set of one or more syntax elements defines, at least in part, a variant for the first test definition;

computer-executable instructions that, when executed by the computing system, cause the computing system to create a second test definition for a second database feature, the second test definition comprising a second syntax comprising a second set of one or more syntax elements and a second set of one or more values for at least a first syntax element of the second set of one or more syntax elements;

computer-executable instructions that, when executed by the computing system, cause the computing system to, based at least in part on the first syntax, the second syntax, at least one syntax element of the first set of one or more syntax elements, and at least one syntax element of the second set of one or more syntax elements, create an executable test definition of a first composite test comprising a variant of the first test definition and a variant of the second test definition, wherein the executable test definition comprises commands executable by a database to perform the first composite test; and (A) computer-executable instructions that, when executed by the computing system, cause the computing system to cause a plurality of composite tests to be executed, the plurality of composite tests comprising the first composite test; and (1) computer-executable instructions that, when executed by the computing system, cause the computing system to receive execution results generated from execution of the plurality of compositive tests; and computer-executable instructions that, when executed by the computing system, cause the computing system to compare an execution result of the first composite test of the execution results with an execution result of a prior execution of the first composite test; or (2) computer-executable instructions that, when executed by the computing system, cause the computing system to receive execution results generated from execution of the plurality of composite tests, wherein the execution results comprise error codes for at least a portion of the plurality of composite tests; or (3) computer-executable instructions that, when executed by the computing system, cause the computing system to receive execution results generated from execution of the plurality of composite tests, wherein the execution results comprise an indication of an error generated during execution of at least one composite test of the plurality of composite tests that is not associated with an error code; or (4) computer-executable instructions that, when executed by the computing system, cause the computing system to receive execution results generated from execution of the plurality of composite tests, wherein the execution results comprise data generated during execution of at least one composite test of the plurality of composite tests; or (5) computer-executable instructions that, when executed by the computing system, cause the computing system to receive execution results generated from execution of the plurality of composite tests, wherein the execution results comprise a summary of data generated during execution of at least one composite test of the plurality of composite tests; or (B) computer-executable instructions that, when executed by the computing system, cause the computing system to monitor use of one or more database instances executing a version of software implementing the database to provide usage data, the usage data comprising data indicating database features executed on the one or more database instances and values for at least one syntax element of a database feature reflected in the usage data.

* * * * *